(12) United States Patent
Toyoda

(10) Patent No.: US 6,880,019 B1
(45) Date of Patent: Apr. 12, 2005

(54) APPARATUS AND METHOD FOR TRANSMITTING AND RECEIVING FOR IMAGE

(75) Inventor: Kiyoshi Toyoda, Kunitachi (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/522,600

(22) Filed: Mar. 10, 2000

(30) Foreign Application Priority Data

Oct. 8, 1999 (JP) .......................................... 11-288174

(51) Int. Cl.⁷ ............................................ G06F 15/173
(52) U.S. Cl. ...................... 709/238; 709/200; 709/206; 709/245
(58) Field of Search ................................ 709/249, 245, 709/206, 200

(56) References Cited

U.S. PATENT DOCUMENTS

| | | | | |
|---|---|---|---|---|
| 5,812,278 A | * | 9/1998 | Toyoda et al. ............... | 358/402 |
| 5,881,233 A | | 3/1999 | Toyoda et al. | |
| 6,061,739 A | * | 5/2000 | Reed et al. .................. | 709/245 |
| 6,384,927 B1 | * | 5/2002 | Mori .......................... | 358/1.15 |
| 6,438,605 B1 | * | 8/2002 | Idehara ....................... | 709/238 |

FOREIGN PATENT DOCUMENTS

| | | |
|---|---|---|
| EP | 0872998 | 10/1998 |
| EP | 0967779 | 12/1999 |
| JP | 8242326 | 9/1996 |
| JP | 9-275466 | 10/1997 |
| JP | 10-84380 | 3/1998 |
| JP | 10-98572 | 4/1998 |
| JP | 11-266278 | 9/1999 |
| JP | 2000-41131 | 2/2000 |
| WO | 98/58492 | 12/1998 |

OTHER PUBLICATIONS

English Language Abstract of JP 11–266278.
English Language Abstract of JP 2000–41131.
English Language Abstract of JP 9–275466.
English Language Abstract of JP 10–84380.
English Language Abstract of JP 10–98572.

* cited by examiner

*Primary Examiner*—Paul H. Kang
*Assistant Examiner*—April L Baugh
(74) *Attorney, Agent, or Firm*—Greenblum & Bernstein, P.L.C.

(57) ABSTRACT

A RARP processing section of a network scanner obtains a MAC address corresponding to a user name from a MAC address table, and broadcasts a RARP request by use of this MAC address. While, a PC sends a pair of a self-IP address and a mail address to a RARP processing section in response to the RARP request. After obtaining an IP address of this PC, a scanner scans an original, and generates e-mail to which the image is appended. Next, an SMTP transmitting section directly transmits the generated e-mail to the PC. At this time, the SMTP transmitting section uses the IP address of PC obtained by the RARP processing section. In the network to which HDCP is introduced, the network scanner automatically obtains the IP address of PC, and directly transmits image data to the PC.

13 Claims, 15 Drawing Sheets

APPARATUS AND METHOD FOR TRANSMITTING AND RECEIVING FOR IMAGE

BACKGROUND OF THE INVENTION

1. Field of the Invention

The present invention relates to an image transmitting and receiving apparatus, which operates on an IP network. Also, the present invention relates to an image transmitting and receiving method on an IP network.

2. Description of the Related Art

In a TCP/IP network, there is a necessity to assign an IP address per client in order to allow control for transmitting and receiving data packet between clients. An means for performing this IP address assignment automatically, there is a DHCP (Dynamic Host Configuration Protocol). A server for a DHCP assigns an IP address in response to a request from the client. Generally, the client transmits a request message when the client's apparatus is turned on, and the server that has received this request assigns a vacant IP address to the client. For this reason, the IP address for the client differs every time when the client's apparatus is started.

While there is conventionally proposed an Internet facsimile apparatus (hereinafter referred to as IFAX) as disclosed in Unexamined Japanese Patent Publication No. HEI 8-242326 and the corresponding U.S. Pat. No. 5,881,233.

In the IFAX, at the time of transmission, a scanner scans each page of an original, and obtains a plurality of image data corresponding to each page. Then, the IFAX transmits e-mail to which the obtained image data is appended to an IFAX on a receiver side. The IFAX on the receiver side prints image data appended to the received e-mail by use of a printer. As one of the uses of this IFAX, there is a network scanner. The network scanner aims to transfer image data obtained by scanning the original to the PC, etc., process it by such PC, and store it thereby.

In the case of using the IFAX as a network scanner, similar to the image communications performed by the aforementioned Internet facsimile apparatus, the IFAX appends a plurality of image data obtained by scanning the original to e-mail, and transmits this e-mail to a specific mail address. An operator accesses a mail server that manages this mail address by use of the PC, which deals with image data, and receives this e-mail.

However, there is a possibility that delay of mail delivery with the mail server will occur when image data is transmitted to the PC via the mail server. Moreover, similar to the case in which e-mail is generally received, since the operator must activate a mailer on PC and obtain access to the mail server, complicated operations are required of the user.

In order to solve such a disadvantage, it can be considered a case in which image data is directly transmitted to the PC using an SMTP instead of transmission via the mail server. In the case of using the SMTP, it is necessary for the IFAX to know the IP address for the PC in order to transfer e-mail to an scanned image-receiving application, which operates on the PC. In the network in which no DHCP server is introduced, since the IP address for the PC is unchanged until the IP address is changed by a network manager, the IP address may be stored in IFAX one time. However, in the network in which the DHCP server is introduced, the IP address is changed every time when the PC is started as mentioned above. For this reason, IFAX can neither specify the IP address for a destination nor directly transmit image data to the PC.

SUMMARY OF THE INVENTION

It is an object of the present invention to provide an image transmitting apparatus, which can obtain an IP address for a communication terminal automatically and which can transmit image data to the communication terminal directly in a network in which a DHCP is introduced.

Also, it is an object of the present invention to provide an image receiving apparatus, which can obtain an IP address for a communication terminal automatically and which can receive image data from the communication terminal directly in a network in which a DHCP is introduced., Moreover, it is an object of the present invention to provide an image transmitting method, which can obtain an IP address for a communication terminal automatically and which can transmit image data from the communication terminal directly in a network in which a DHCP is introduced.

Furthermore, it is an object of the present invention to provide an image receiving method, which can obtain an IP address for a communication terminal automatically and which can receive image data from the communication terminal directly in a network in which a DHCP is introduced.

Thus, the present invention provides a image data transmitting apparatus which store a physical address of the image receiving apparatus, which is assigned from an outer section, and obtains an IP address of the image receiving apparatus by use of this physical address, and transmits image data of the image receiving apparatus by use of this IP address.

This makes it possible to perform an image transmission using a communication protocol, which needs an IP address for a receiver side, in accordance with, for example, a DHCP protocol in the network in which an IP address is assigned to a communication terminal from an outer section.

Also, the present invention provides a image data receiving apparatus informs an image transmitting apparatus of its own physical address, and informs an IP address, which is assigned from an outer section in accordance with the request from the image transmitting apparatus using its own physical address, and directly receives image data from the image transmitting apparatus by use of this IP address.

This makes it possible to perform an image reception using a communication protocol, which needs an IP address for a receiver side, in accordance with, for example, a DHCP protocol in the network in which an IP address is assigned to a communication terminal from an outer section.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will be specifically explained with reference to the accompanying drawings herewith.

(First Embodiment)

Figure 1:
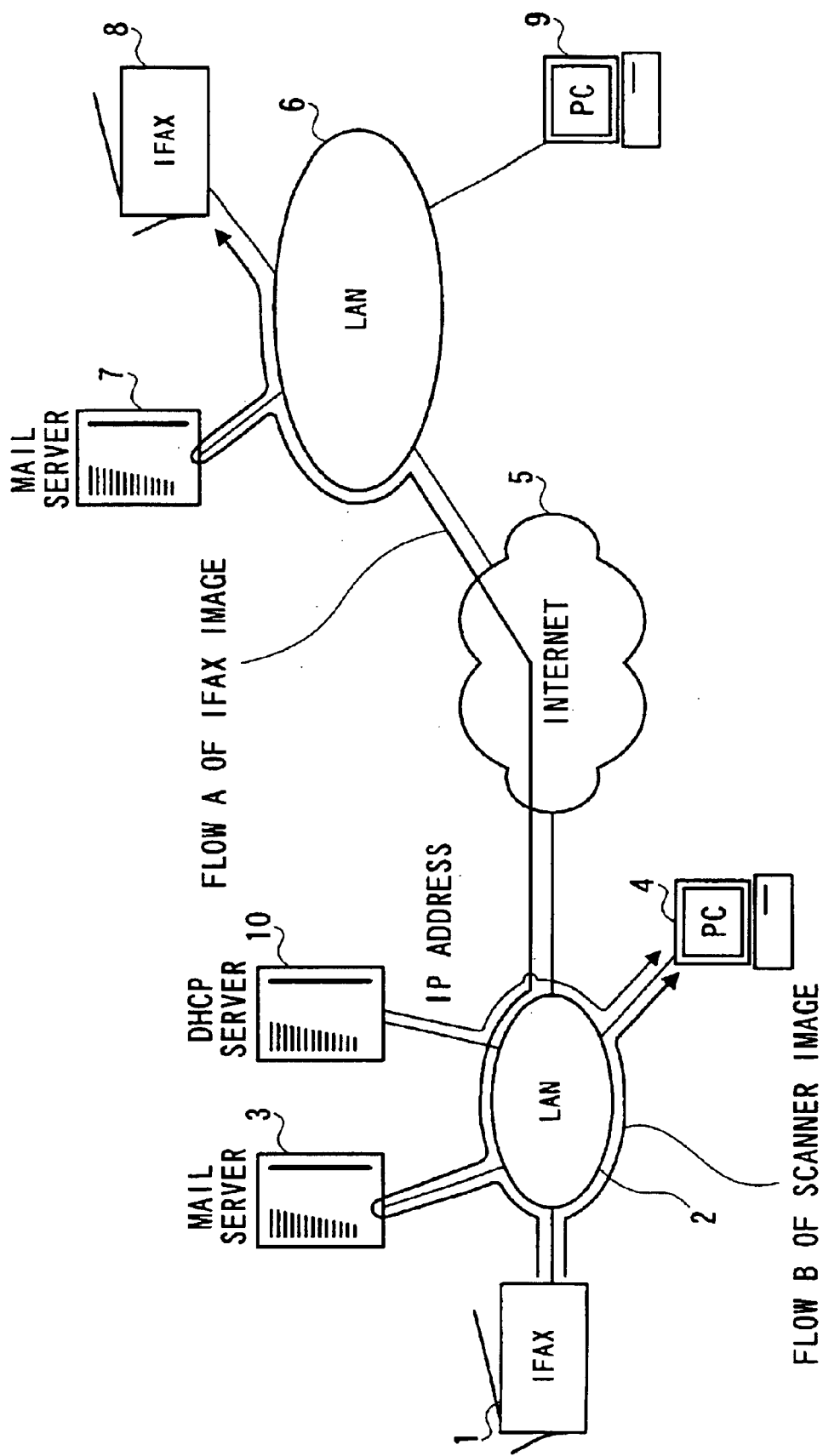
FIG. 1 is a conceptual view showing a network system in which an image transmitting apparatus and an image receiving apparatus according to a first embodiment of the present invention operate.

FIG. 1 is a conceptual view showing a network system in which an image transmitting apparatus and an image receiving apparatus of according to a first embodiment of the present invention operate.

An Internet facsimile apparatus 1 (hereinafter referred to as IFAX) according to the first embodiment is connected to a local area network (LAN) 2. A mail server 3 and a personal computer (PC) 4, which are installed in the same local area as the IFAX 1, are connected to the LAN 2. Though a large number of PCs 4 is provided, one of them is illustrated for convenience in explanation.

Also, the LAN 2 is connected to the Internet 5. The other LAN 6 is also connected to this Internet 5. A mail server 7, an IFAX 8, and a PC 9 are connected to this LAN 6.

IFAX 1 transmits and receives image data between, for example, the IFAX 8 and the IFAX 1 by use of e-mail. As shown by an arrow A of FIG. 1, e-mail is first transmitted to the mail server 3 of the transmitter side. The mail server 3 of the transmitter side transfers e-mail to the mail server 7 of the receiver side. The mail server 7 of the receiver side stores this e-mail. The IFAX 8 of the receiver side accesses the mail server 7 of the receiver side, and receives e-mail.

The aforementioned processing is referred to as IFAX transmission processing. While, the IFAX 1 directly transmits image data, which has been obtained by scanning an original by use of a scanner, to the PC 4 using e-mail. The IFAX 1 performs the transfer of e-mail between the mail server 3 and the PC 4 in accordance with, for example, a mail transfer protocol, more specifically, an SMTP (Simple MAIL Transfer Protocol). The above-mentioned processing is referred to as network scanner processing.

A DHCP (Dynamic Host Configuration Protocol) server 10 is provided in the LAN 2. This DHCP server 10 automatically assigns an IP address to the PC 4 in accordance with a request from the PC 4, which is a DHCP client.

Figure 2:
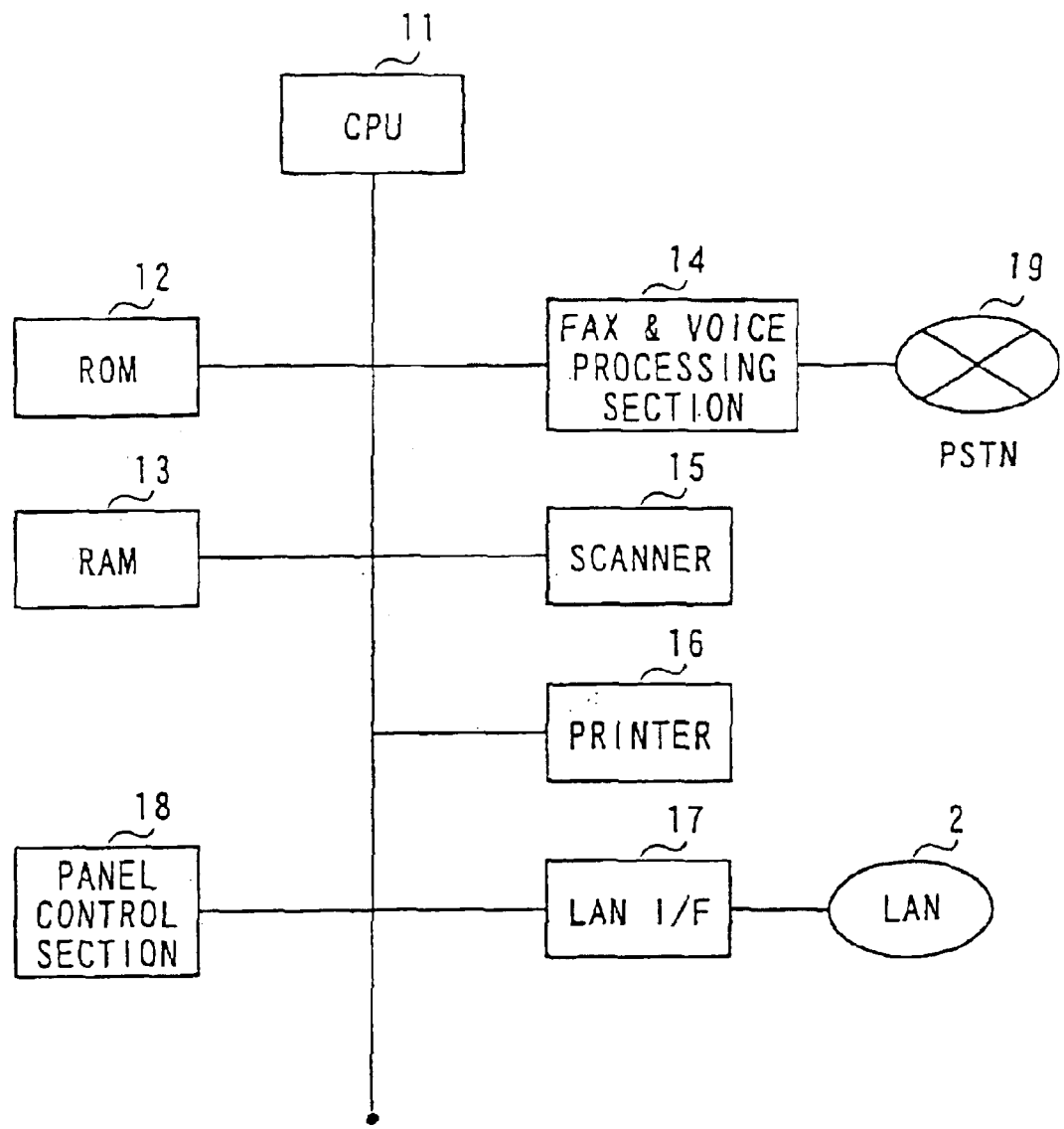
FIG. 2 is a block diagram showing hardware of an Internet facsimile apparatus according to the above-mentioned first embodiment.

FIG. 2 is a block diagram showing hardware of the Internet facsimile apparatus according to the first embodiment. A CPU 11 executes a program, and performs control of the entirety of the apparatus. A ROM 12 stores the program to be executed by the CPU 11.

A RAM 13 has a work area where the program is executed, and a buffer area for temporarily storing various data such as e-mail, an image file, etc.

A FAX & voice processing section 14 modulates facsimile data and a voice and outputs modulated data to a PSTN 19, and demodulates modulated data received from the PSTN 19 to facsimile data and voice data.

A scanner 15 scans an original, and obtains image data. A printer 16 prints various data including image data received.

A LAN interface 17 executes a protocol necessary for transmitting and receiving data on the LAN 2.

A panel control section 18 comprises dial keys and a touch panel, and receives operations such as a specification of a destination, an instruction of a transmission start, etc., which are executed by an operator.

Figure 3:
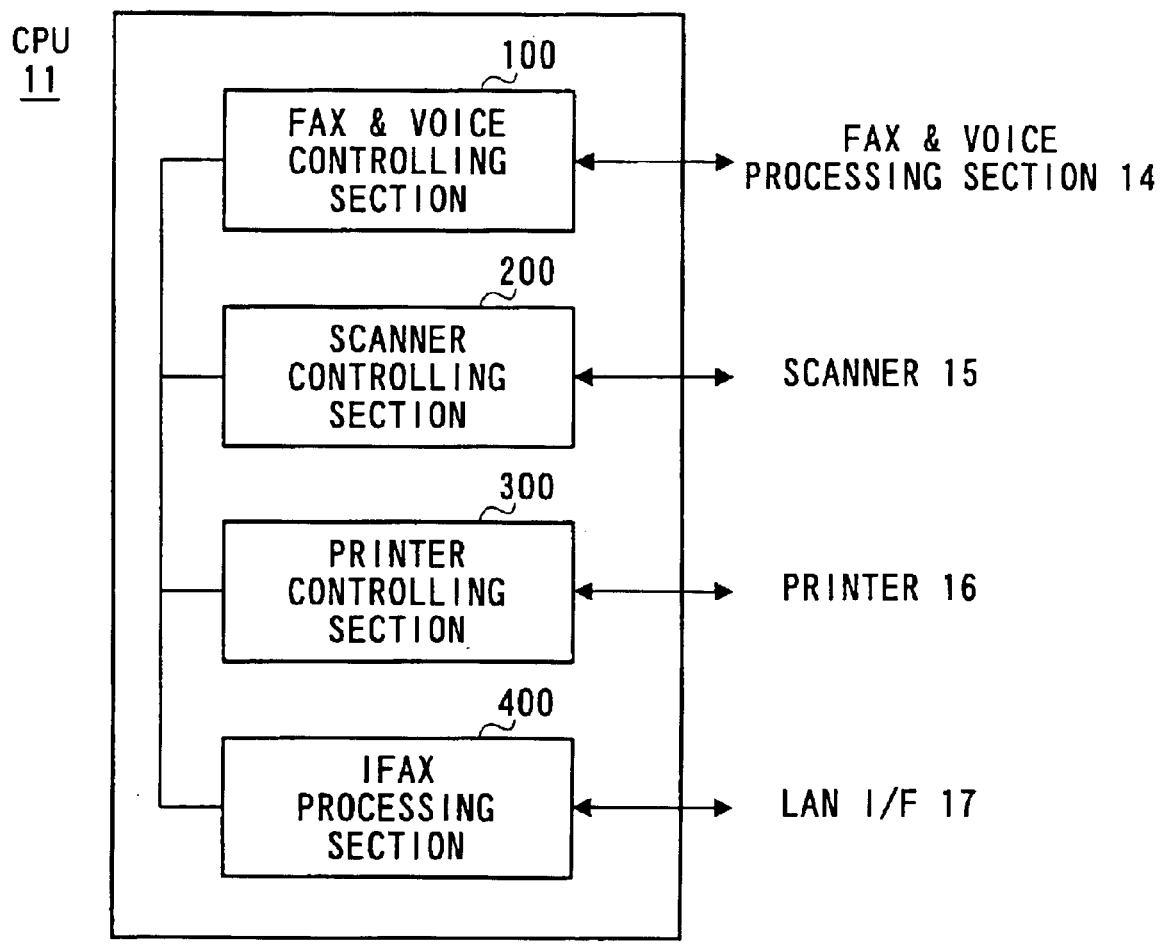
FIG. 3 is a block diagram showing the functions of the Internet facsimile apparatus according to the above-mentioned first embodiment.

The ROM 12 stores the program, and the CPU 11 executes the program. The functions, which are resultantly implemented, are explained as follows. FIG. 3 is a block diagram showing the functions of the IFAX according to the first embodiment.

The IFAX 1 comprises a FAX & voice controlling section 100, a scanner controlling section 200, and a printer controlling section 300 to control each processing section of the FAX & voice processing section 14, the scanner 15, and the printer 16.

The IFAX 1 also comprises an IFAX processing section 400, which implements the function as IFAX. This IFAX processing section 400 transmits and receives e-mail via the LAN 2 by use of the LAN interface 17. In other words, the IFAX processing section 400 receives e-mail from a sender, and prints received data by use of the printer 16. At this time, if an image file is appended to e-mail, the content of the image file is printed by the printer 16. While, the IFAX processing section 400 converts image data obtained by the scanner 15 to e-mail, and transmits it.

Figure 4:
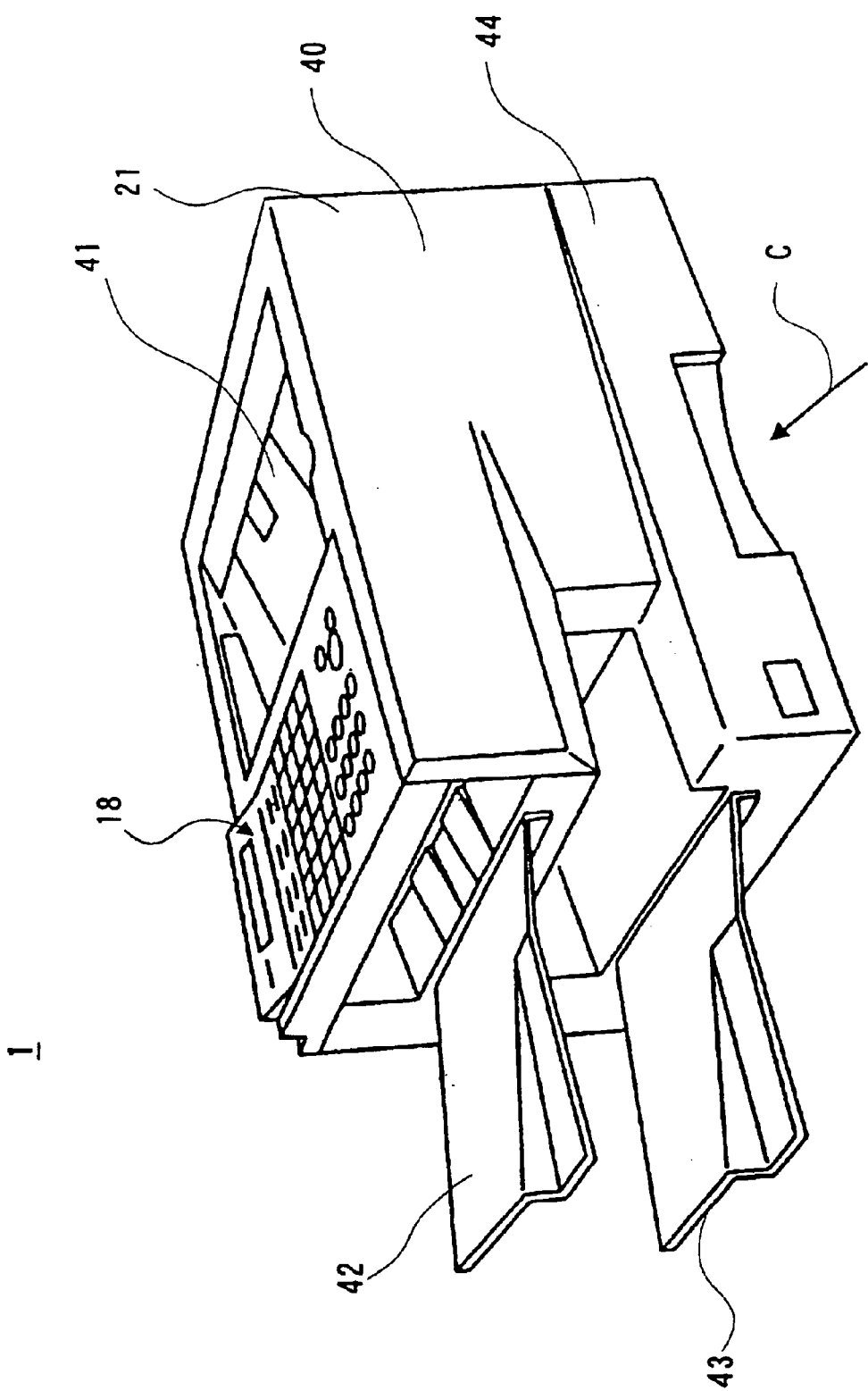
FIG. 4 is a perspective view showing an outline of the Internet facsimile apparatus according to the above-mentioned first embodiment.

FIG. 4 is a perspective view showing an outline of the Internet facsimile apparatus according to the first embodiment of the present invention. The following will explain a case in which the IFAX 1 is seen from the direction shown by an arrow C of FIG. 4. In the IFAX 1, the scanner 15 and the printer 16 are integrated into a housing 40 (comprising upper and lower body sections 21 and 44 respectively) together with other structural elements, that is, CPU 11, ROM 12, RAM 13, FAX & voice processing section 14, LAN interface 17, and panel control section 18. The panel control section 18 is provided at the left surface side, which is an upper surface portion of the IFAX 1. A document plate 41 for supplying an original to the scanner 15 is provided at the right side of the panel control section 18. Output trays 42 and 43 for receiving printed materials discharged from the printer 16 are vertically provided at the left side surface portion of the IFAX 1. A paper feeder section 24 for feeding printing paper to the printer 16 is provided at a bottom surface portion of the IFAX 1.

Figure 5:
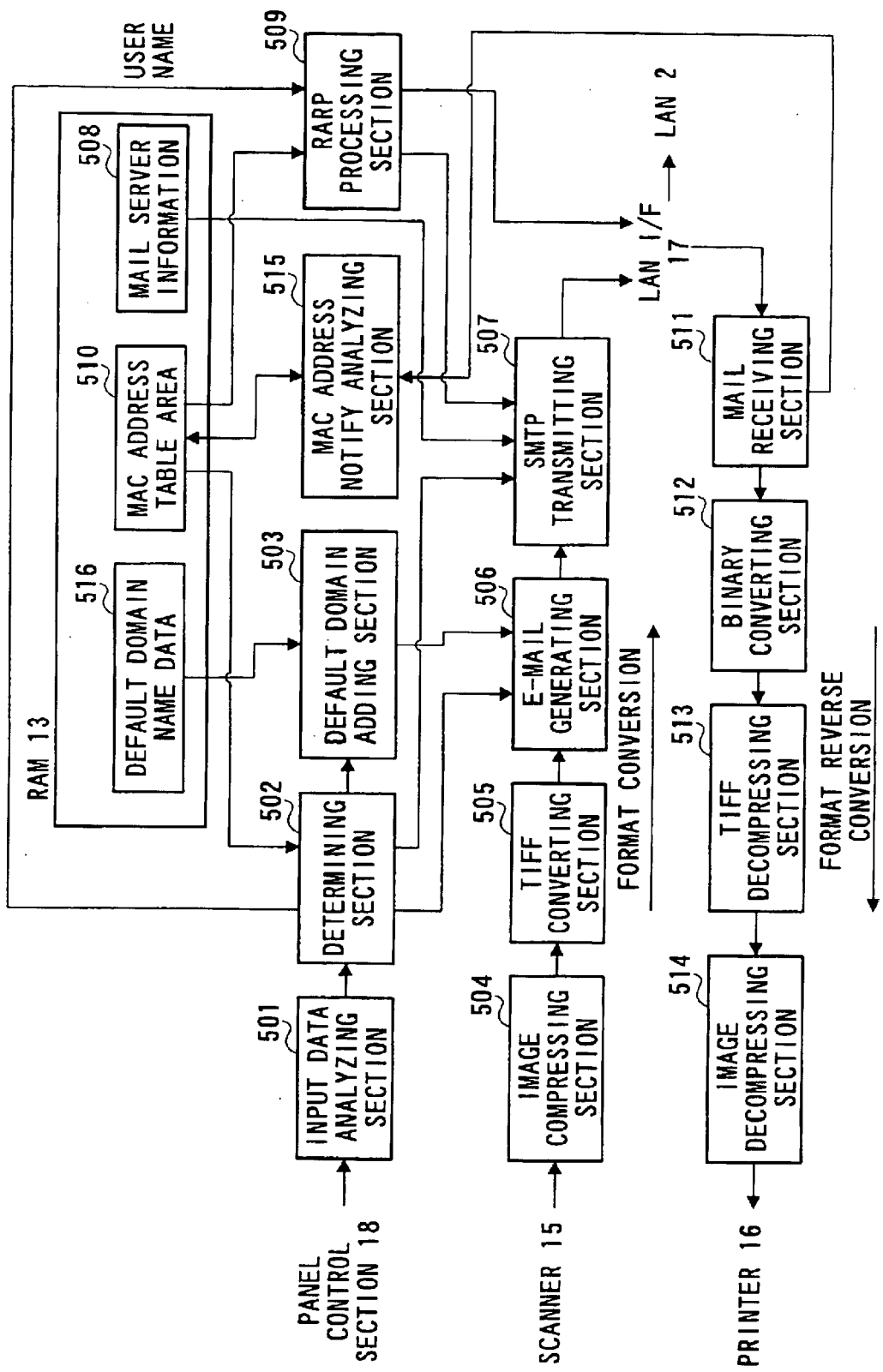
FIG. 5 is a functional block diagram showing an IFAX processing section of the Internet facsimile apparatus according to the above-mentioned first embodiment.

FIG. 5 is a functional block diagram showing the IFAX processing section 400 of the IFAX according to the first embodiment of the present invention.

An input data analyzing section 501 analyzes whether or not input data includes an at sign "@", that is, whether or not input data is a user name. The input data analyzing section 501 sends the result of analysis to a determining section 502. The determining section 502 determines processing afterward on the basis of this analysis.

When input data is only the user name, a default domain adding section 503 adds a default domain name to this user name, and obtains a mail address. The default domain name is stored in a default domain name area 516 of RAM 13.

A scanner control section 200 shown in FIG. 3 stores raw image data to a buffer for scanner prepared in the RAM 13. The image obtained by scanning the original is hereinafter referred to as original image. The original image is raw data has been obtained when the scanner 15 scans the original, that is, bit map data in this example.

An image compressing section 504 compresses the original image stored in the buffer for scanner. The compression format here is HM, MR, MMR, etc. The original image is prepared in unit of one page of the original, and the compression is also performed in unit of one page of the original.

A TIFF converting section 505 converts a plurality of compressed data to one ITFF (Tagged Image File Format) file. An e-mail generating section 506 converts the TIFF file to text code data, and adds this text code data to a multi-part mail in accordance with MIME (Multipurpose Internet Mail Extension). Thereby, e-mail to which image data is appended is generated.

An SMTP transmitting section 507 transmits e-mail generated by the e-mail generating section 506 to the LAN 2 through the LAN interface 17 in accordance with SMTP (Simple Mail Transfer Protocol).

The SMTP transmitting section 507 transfers e-mail to a different destination in IFAX transmission processing and Network scanner processing. In other words, the SMTP transmitting section 507 transfers e-mail to the mail server 3 of the transmitting side in IFAX transmission processing, while directly transmits e-mail to the PC 4 in network scanner processing. Information of the mail server 3 of the transmitting side is obtained from mail server information 508 of RAM 13.

The SMTP transmitting section 507 transfers e-mail from IFAX 1 to an application for directly receiving the original image from the IFAX and the SMTP transmitting section 507 in accordance with SMTP In network scanner processing. Hereinafter, the application is referred to as scanned image-receiving application. At this time, since SMTP is used as a communication protocol, the SMTP transmitting section 507 must be informed of the IP address of PC 4. However, the DHCP server 10 is provided in the LAN 2 of the first embodiment, and the IP address of PC 4 is automatically assigned from the DHCP server 10 at the time of activating PC 4. For this reason, the IP address of PC 4 changes every time when the PC 4 is activated.

In the first embodiment, the operator inputs the user name of the mail address of PC 4 in network scanner processing but does not input the IP address of PC 4. Therefore, the IFAX 1 according to the first embodiment comprises a RARP processing section 509 for obtaining the IP address on the basis of the user name. This RARP processing section 509 can know the IP address from a physical address such as a MAC (Media Access Control) address as a RARP (Reverse Address Resolution Protocol) client. The MAC address is a physical address, which is distributed per a LAN controller for controlling LAN, and which is the only one address in the world, and which is composed of 48 bits.

Also, the RARP processing section 509 can obtain the MAC address corresponding to the user name with reference to a MAC address table on the basis of the user name received from the determining section 502. The MAC address table is stored in a MAC address table area 510 of RAM 13.

A mail receiving section 511 receives e-mail via the LAN interface 17. The mall receiving section 511 uses a mail transfer protocol such as SMTP, POP (Post Office Protocol, etc. A binary converting section 512 decodes the text code, which is included in the appended file part of received e-mail, to a TIFF file. A TIFF decompressing section 513 decompresses this TIFF file, and sends compressed data to an image decompressing section 514. The image decompressing section 514 decompresses compressed data to bit map data. The printer 16 prints this bit map data.

Figure 6:
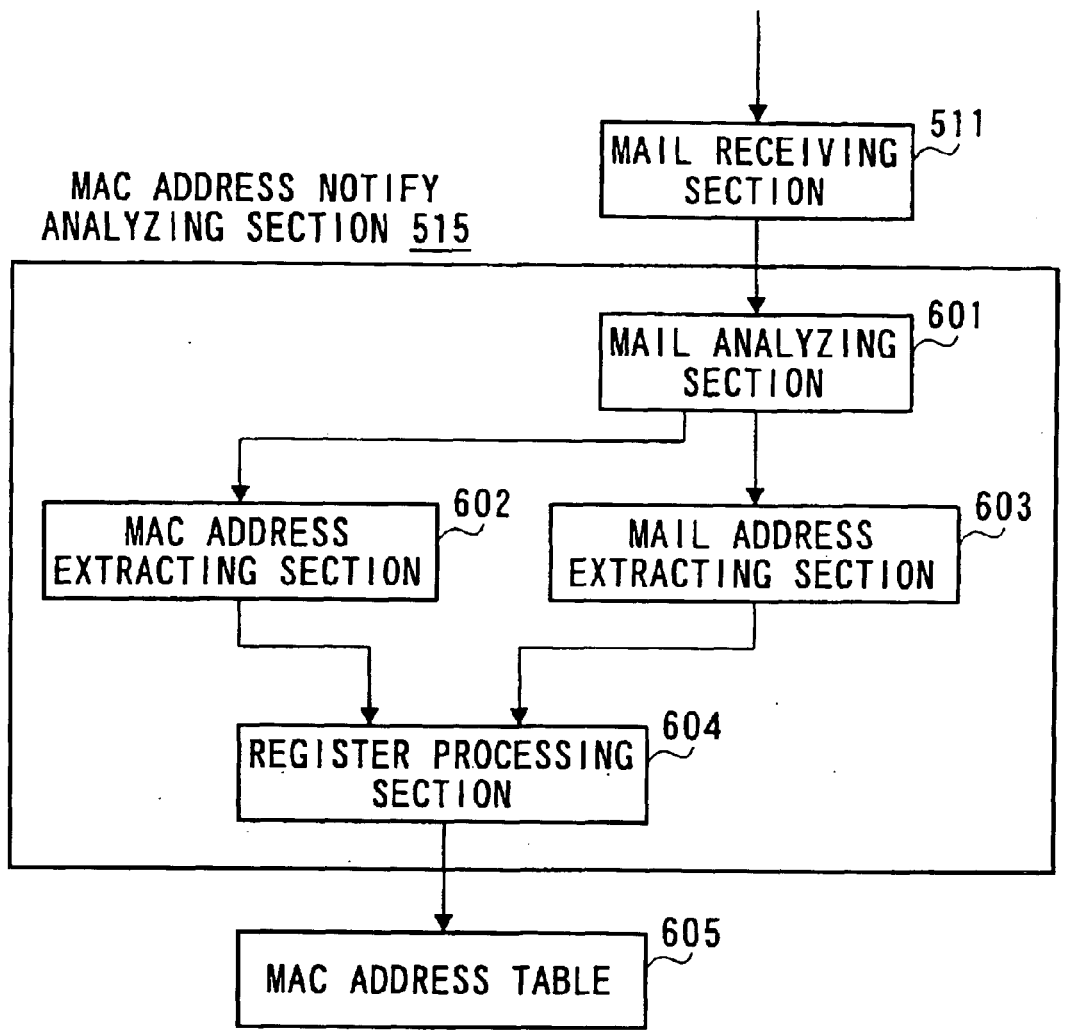
FIG. 6 is a functional block diagram showing an MAC address notify analyzing section of the Internet facsimile apparatus according to the above-mentioned first embodiment.

A MAC address notification analyzing section 515 analyzes e-mail (hereinafter referred to as MAC address notification) for providing notification of the MAC address of PC 4 and the mail address, and registers the result of analysis in the MAC address table. FIG. 6 is a block diagram showing the MAC address notification analyzing section 515 of the IFAX 1 according to the first embodiment. The MAC address notification analyzing section 515 analyzes includes a mail analyzing section 601 that analyzes whether e-mail received by the mail receiving section 511 is a general e-mail or MAC address notification. If this e-mail is the MAC address notification, a MAC address extracting section 602 and a mail address extracting section 603 extract the MAC address and the mail address of PC 4 from this MAC address notification, respectively. A register processing section 604 pairs the extracted MAC address with the mail address, and registers it in a MAC address table 605. In this embodiment, since all terminals in the LAN 2 including the PC 4 have the same domain name, that is, default name, the user name is registered in the MAC address table 605 in place of the mail address.

Figure 7:
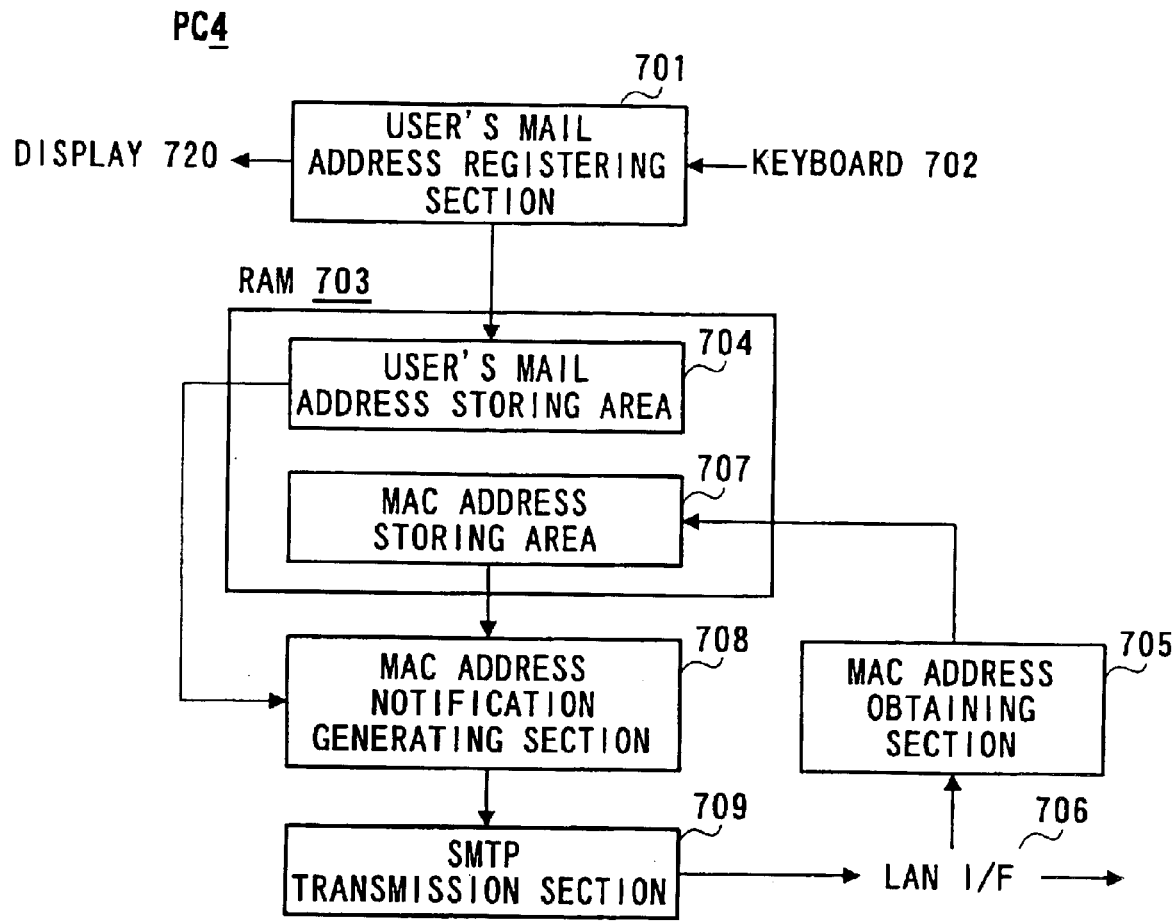
FIG. 7 is a functional block diagram showing an scanned image-receiving application, which operates on PC, according to the above-mentioned first embodiment.

FIG. 7 is a block diagram showing a MAC address notifying function of the PC 4 according to the first embodiment. The scanned image-receiving application, which is operated by the PC 4, performs an initial setting operation for setting its own mail address. A user's mail address registering section 701 registers the its own mail address input by a keyboard 702 in a user's mail address storing area 704 of a RAM 703 and can display the same on a display 720. Also, a MAC address obtaining section 705 obtains a MAC address of a LAN interface 706, and stores it to a MAC address storing area 707 of the RAM 703. A MAC address notification generating section 708 generates a MAC address notification including the its own mail address and MAC address. An SMTP transmission section 709 transmits this MAC address notification to the FAX 1 as a network scanner via the LAN interface 706.

Figure 8:
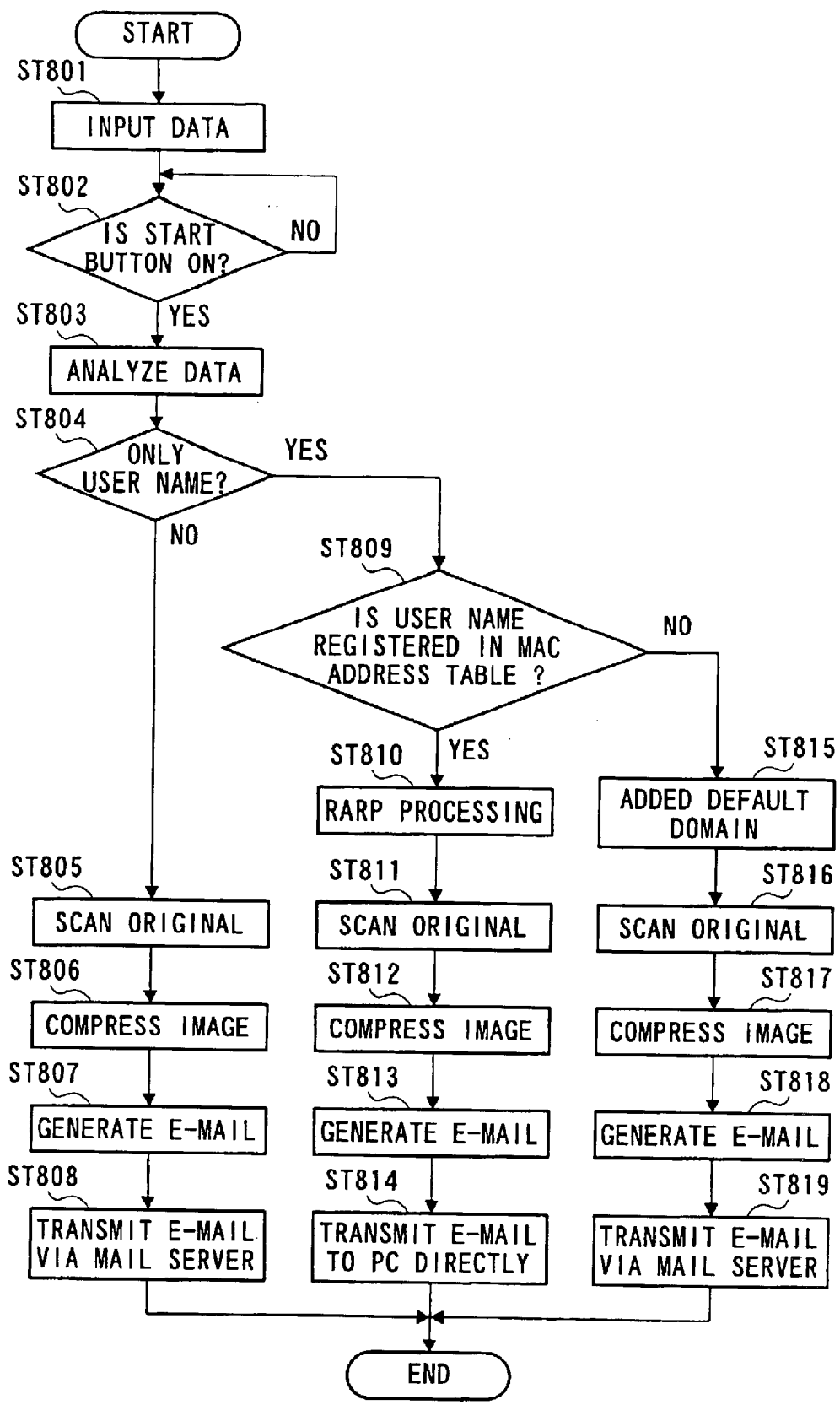
FIG. 8 is a flowchart showing image transmission processing of the Internet facsimile apparatus according to the above-mentioned first embodiment.

Next, an explanation will be given of an image transmitting operation of the above-configured IFAX according to the first embodiment. FIG. 8 is a flowchart showing the image transmitting operation of the Internet facsimile apparatus according to the first embodiment 1. The following explains IFAX transmission processing in which transmission from IFAX 1 shown in FIG. 1 to IFAX 8 is performed, and network scanner processing in which scanning from IFAX 1 to PC 4 is performed.

The operator depresses an Internet button of the panel control section 18 after placing the original on the document plate of the IFAX, and changes an input mode of the panel control section 18 to a character string input mode. This makes it possible for the operator to input character strings such as an alphabet, a mark, etc., using the one-touch button of the panel control section 18, a program button.

In step (hereinafter referred to as ST) 801, an input data analyzing section 501 receives input data from the panel control section 18. Next, in ST802, if the start button is depressed, the input data analyzing section 501 analyzes input data in ST803. The input data analyzing section 501 sends the result of analysis to the determining section 502.

In ST803, the determining section 502 determines whether or not input data is only the user name on the basis of the result of analysis. More specifically, if an at sign "@" is not included in input data, the determining section 502 determines that input data is only the user name. While, if an at sign "@" is included in input data, the determining section 502 determines that input data is an entire address.

Here, if the determining section 502 determines that input data is not the user name, the determining section 502 instructs each section to execute IFAX transmission processing. Specifically, in ST805, the scanner controlling section 200 causes the scanner 15 to scan the original, and stores the resultantly obtained original document to the buffer for a scanner. Next, in step S806, the image compressing section 504 compresses the original image. Thereafter, in ST807, the TIFF converting section 505 converts compressed data to a TIFF file, and enters this TIFF in the appended file part of e-mail, and also enters the mail address input to [To:] filed of this e-mail therein. As a result, e-mail to which the original image is appended is generated. Next, the SMTP transmitting section 507 transmits the generated e-mail to the IFAX 8 via the mail server 3 of the transmitting side. At this time, the SMTP transmitting section 507 obtains information of the mail server 3 of the transmitting side from the mail server information area 508 of RAM 13, and puts it to use.

While, if the determining section 502 determines that input data is only the user name, the determining section 502 instructs each section to execute network scanner processing. Specifically, In ST809, it is checked whether or not the user name is registered in the MAC address table 605.

If the input user name is registered in the MAC address table 605 in ST809, the RARP processing section 509 executes RARP processing in ST810. In other words, the RARP processing section 509 obtains a MAC address corresponding to the user name from the MAC address table 605, and obtains the IP address from the PC 4 as a RARP server by use of this MAC address.

Figure 9:
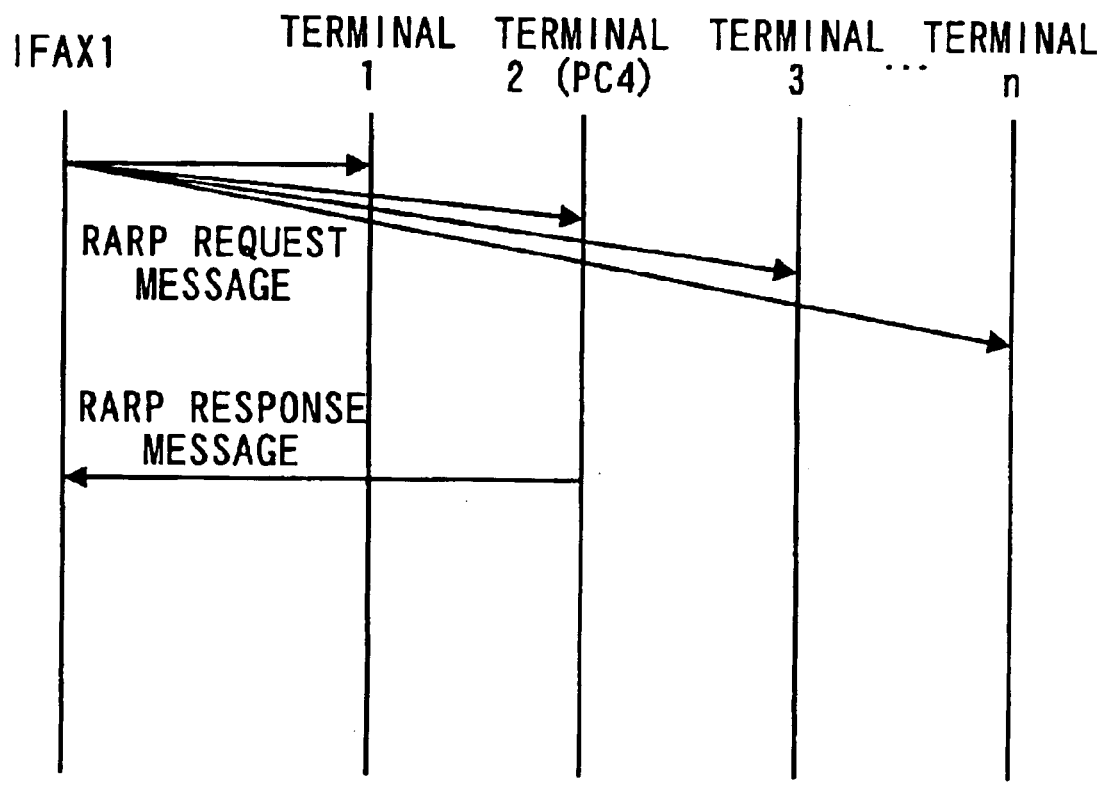
FIG. 9 is a sequence view showing RARP processing according to the above-mentioned first embodiment.

FIG. 9 is a sequence view showing RARP processing performed by the IFAX 1 according to the first embodiment. The IFAX 1 broadcasts RARP request messages to terminals 1 to n existing on the LAN 2. The terminals 1 to n mount a RARP server function thereon, identify the RARP request message about its own MAC address, and sends a RARP response message including a pair of its own MAC address and its own IP address. In this example, the IFAX 1 broadcasts the RARP request message in which the MAC address of PC 4 is set, so that the terminal 2 (PC 4) sends the RARP response message to the IFAX 1.

Here, though the RARP server function is provided to all terminals 1 to n, the number of RARP servers, which perform the RARP service, may be at least one on the network.

After obtaining the IP address by the RARP processing, the scanner 15 scans the original in ST811. Next, the image compressing section 504 compresses the original image in ST812. Thereafter, e-mail to which the original image is appended is generated in ST813. Next, the SMTP transmitting section 507 directly transmits the generated e-mail to the PC 4 in accordance with SMTP in ST814. At this time, the SMTP transmitting section 507 uses the PC4's IP address of PC 4 obtained in ST810.

While, if the user name is not registered in the MAC address table in ST809, the default domain adding section 503 adds a default domain name to the input name in ST815, that is, the user name, and generates a destination mail address. The default domain adding section 503 sends the generated destination mail address to the e-mail generating section 507. Thereafter, the scanner 15 scans the original in ST816. Next, the image compressing section 504 compresses the original image in ST817. After that, e-mail to which the original image is appended is generated in ST818. Next, the SMTP transmitting section 507 transmits the generated e-mail to the IFAX 8 via the mail server 3 of the transmitting side in ST819. At this time, the SMTP transmitting section 507 obtains information of the mail server 3 of the transmitting side from the mail server information area 508 of RAM 13, and puts it to use.

Figure 10:
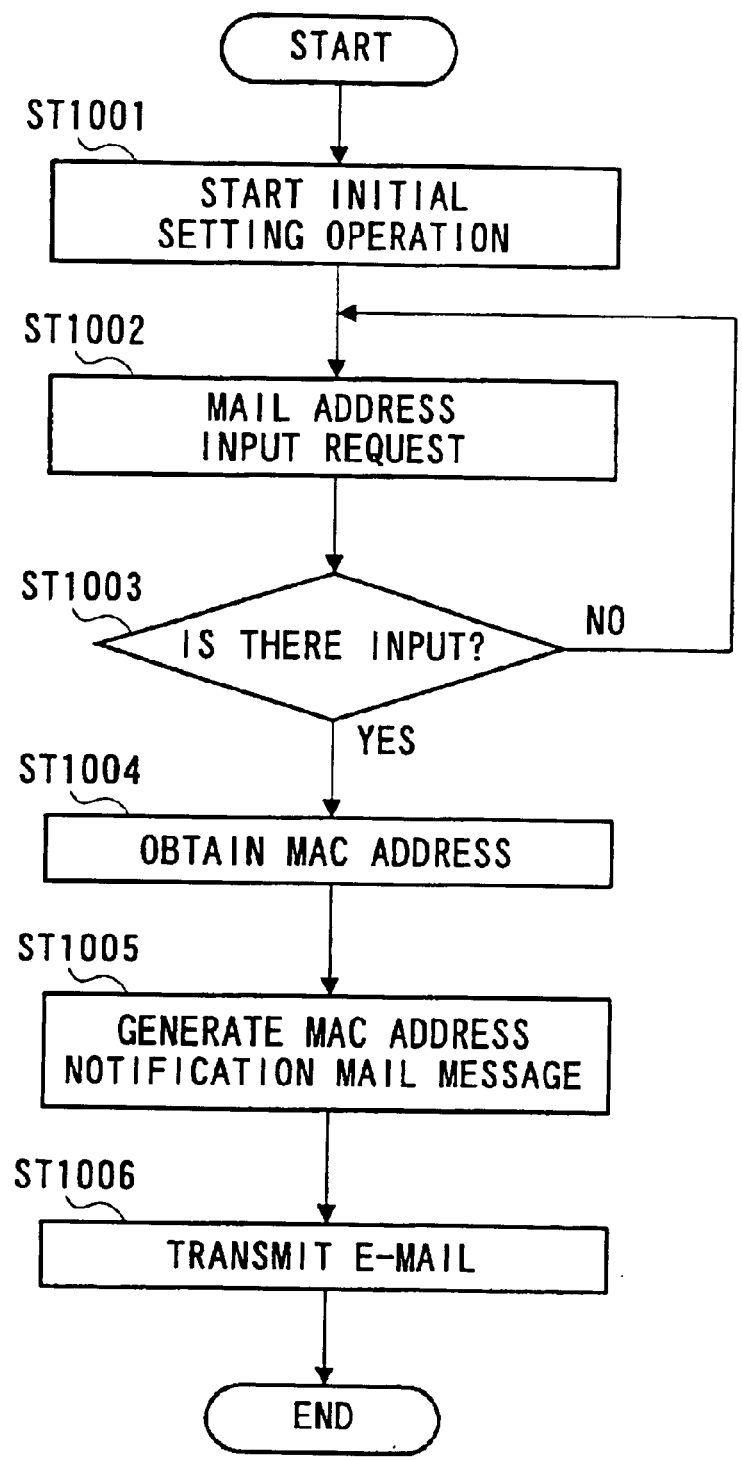
FIG. 10 is a flowchart showing MAC address notify processing by an scanned image-receiving application, which operates on PC, according to the above-mentioned first embodiment.

FIG. 10 is a flowchart showing an initial setting operation, which is executed on the PC 4 by the scanned image-receiving application. In ST1001, the initial setting operation is started. In ST1002, the user's mail address registering section 701 shown in FIG. 7 displays a screen to request a display 720 to input the mail address of the self-apparatus. The user's address registering section 701 waits the completion of input in ST1003. If the mail address is input by the keyboard 702, the user's mail address registering section 701 stores this mail address to the user's mail address storing area 704 of RAM 703.

Next, in ST1004, the MAC address obtaining section 705 obtains the MAC address from the LAN interface 706, and stores it to the MAC address storing area 707 of RAM 703.

In ST1005, a MAC address notification generating section 708 extracts the its own mail address and the MAC address from the user's mail address storing area 704 and the MAC address storing area 707, and generates a MAC address notification.

In ST1006, the SMTP transmitting section 709 transmits the MAC address notification to the IFAX 1.

Figure 11:
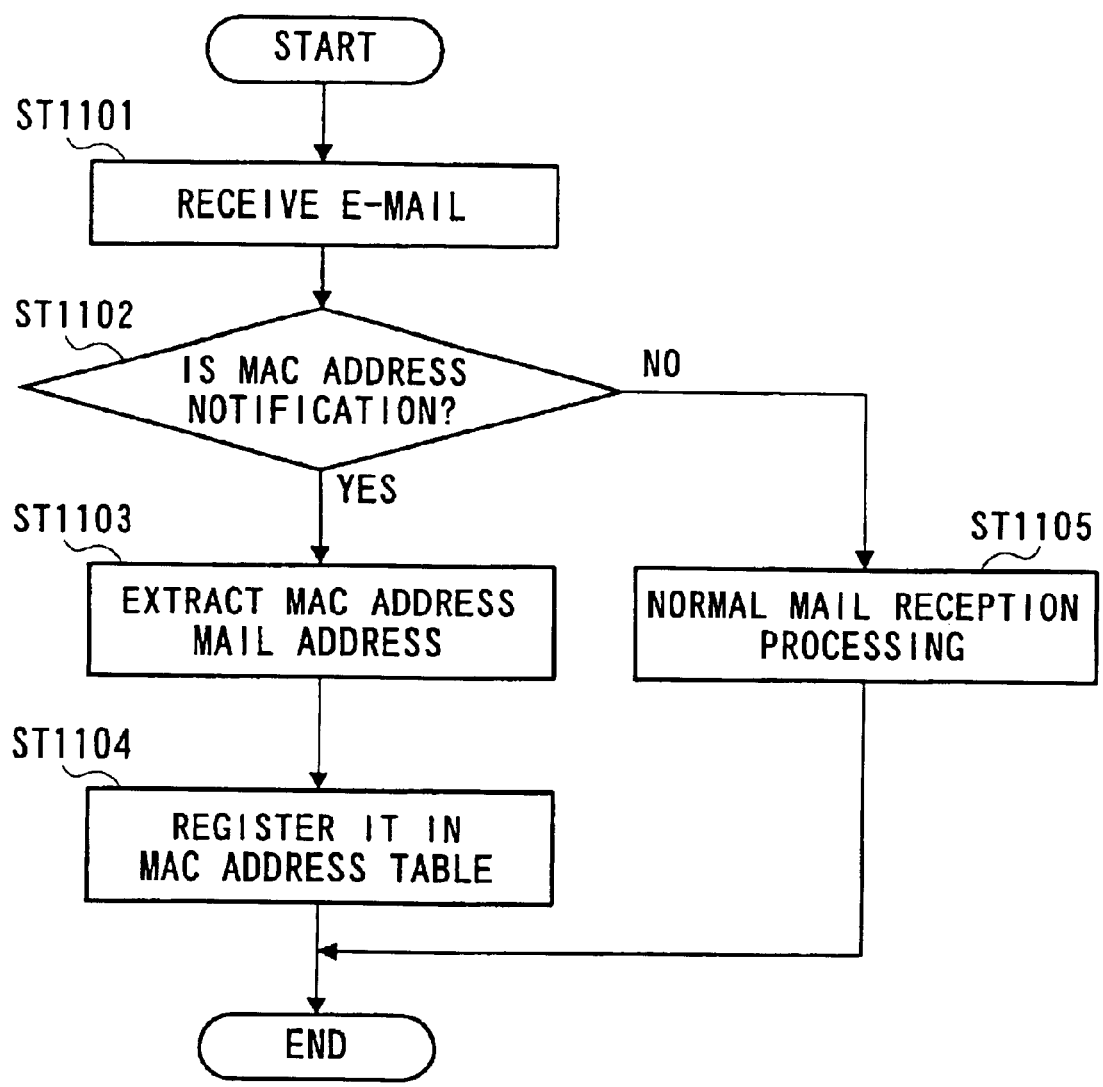
FIG. 11 is a flowchart showing MAC address notify reception processing of the Internet facsimile apparatus according to the above-mentioned first embodiment.

FIG. 11 is a flowchart showing processing, which is performed when the IFAX 1 according to the first embodiment receives the MAC address notification. In ST1101, the mail receiving section 511 shown in FIG. 6 receives e-mail. In ST1102, a mail analyzing section 601 of the MAC address notification analyzing section 515 checks whether or not e-mail is the MAC address notification. Here, if e-mail is the MAC address notification, the MAC address extracting section 602 and the mail address extracting section 603 extract the MAC address of PC 4 and the mail address from the MAC address notification, respectively in ST1103. Next, the register processing section 604 pairs the extracted MAC address with the mail address, and registers it in the MAC address table 605 at step ST1104. While, if e-mail is the general mail in ST1102, general mail reception processing is executed in ST1105.

As explained above, according to the IFAX 1 of the first embodiment, the MAC address of PC 4 is stored, the IP address of PC 4 is obtained by use of this MAC address, and image data is directly transmitted to the PC 4 by SMTP using the obtained IP address. This makes it possible to implement the network scanner, which directly transmits image data to the PC 4, in the network in which the IP address is assigned to the PC 4 from the DHCP server 10.

Also, according to the IFAX 1 of the first embodiment, the MAC address is stored to correspond to the user name of the mail address of PC 4. Then, the MAC address corresponding to this user name is obtained by the user name input by the operator, the IP address of PC 4 is obtained by use of this MAX address, and image data is directly transmitted to the PC 4 by SMTP using the obtained IP address. As a result, since the operator has only to input the user name, a complicated operation is not particularly required, and high knowledge about the network of such as MAC address, etc., is not required. The mail address may be, of course, used in place of the user name. Moreover, it is possible to use a logon name of a user, a name of a terminal, an ID of a terminal, etc., which are irrelevant to the mail address.

Further, according to the IFAX 1 of the first embodiment, if the MAC address notification including a pair of MAC address and IP address is received from the PC 4, the MAC address and the mail address are stored on the basis of this MAC address notification. This makes it unnecessary for the operator to perform such complicated operations in which the MAC address of the PC 4 and the mail address are checked and registered in the IFAX 1. Also, no high knowledge about the network of such as MAC address, etc., is required.

Furthermore, the scanned image-receiving application, which is operated on the PC, according to the first embodiment, obtains the MAC address from the LAN interface 17 of PC 4, and generates the MAC address notification including the pair of its own MAC address and its own mail address, and transmits it to the IFAX 1. This makes it unnecessary for the operator to perform such complicated operations in which the MAC address of the PC 4 and the mail address are checked and registered in the IFAX 1. Also, no high knowledge about the network of such as MAC address, etc., is required.

Moreover, according to the IFAX 1 of the first embodiment. IFAX transmission processing and network scanner processing are differentiated on the basis of the fact whether or not the operator inputs only the user name. Whereby, the operator has only to input only the user name when instructing network scanner processing. This first embodiment is very useful since the destination PC often belongs to the same domain as that of the IFAX when the IFAX is used as a network scanner.

Moreover, according to the first embodiment, when the input data analyzing section 501 analyzes input data, the determining section 502 determines that input data is the user name of the mail address and the user name is not registered in the MAC address table, the default domain adding section 503 fetches the default domain name form RAM 13 and adds it to this user name. As a result, since the operator has only to input only the user name, the operator can easily perform the input of the destination address from the panel control section 18, which is relatively difficult, without generating errors. Moreover, since processing is not decided on the basis of the content of registration, the operator can instruct desired processing regardless of the content of the registration.

(Second Embodiment)

Next, an explanation will be given of the IFAX according to the second embodiment of the present invention.

Figure 12:
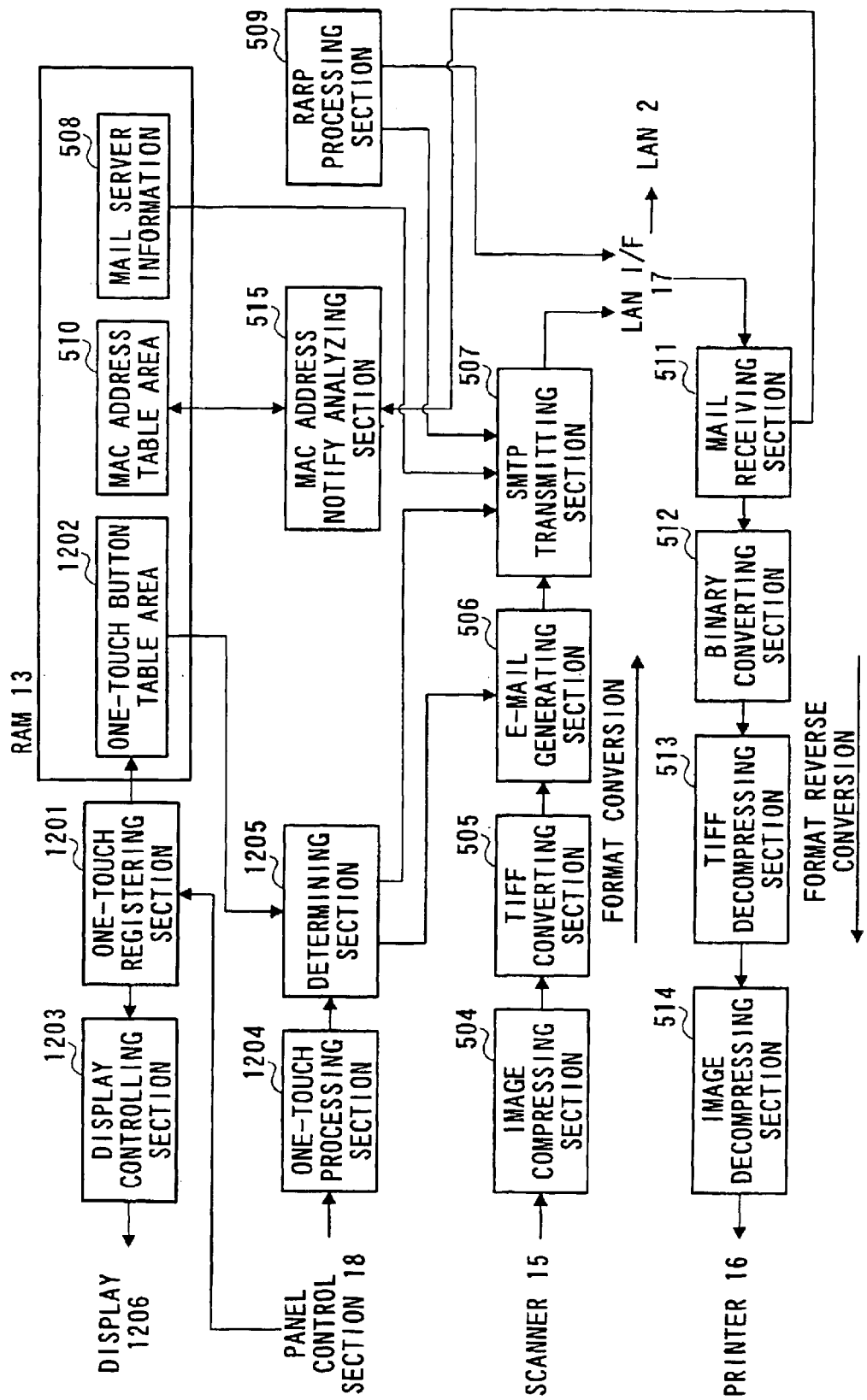
FIG. 12 is a functional block diagram showing an IFAX processing section of the Internet facsimile apparatus according to a second embodiment of the present invention.

FIG. 12 is a functional block diagram showing the IFAX processing section of the IFAX according to the second embodiment. Regarding the same configuration as that of the first embodiment shown in FIG. 1, the same reference numerals as those of the first embodiment are added thereto, and the explanation is omitted.

A one-touch registering section 1201 assigns a desired destination mail address to the one-touch button of the panel control section 18. The one-touch registering section 1201 controls the registration made by the operator, and writes the content of registration to a one-touch button table stored in a one-touch button table area 1202 of RAM 13. Also, The one-touch registering section 1201 registers whether this destination mail address is used for IFAX transmission processing or network scanner processing at the same time.

Figure 13:
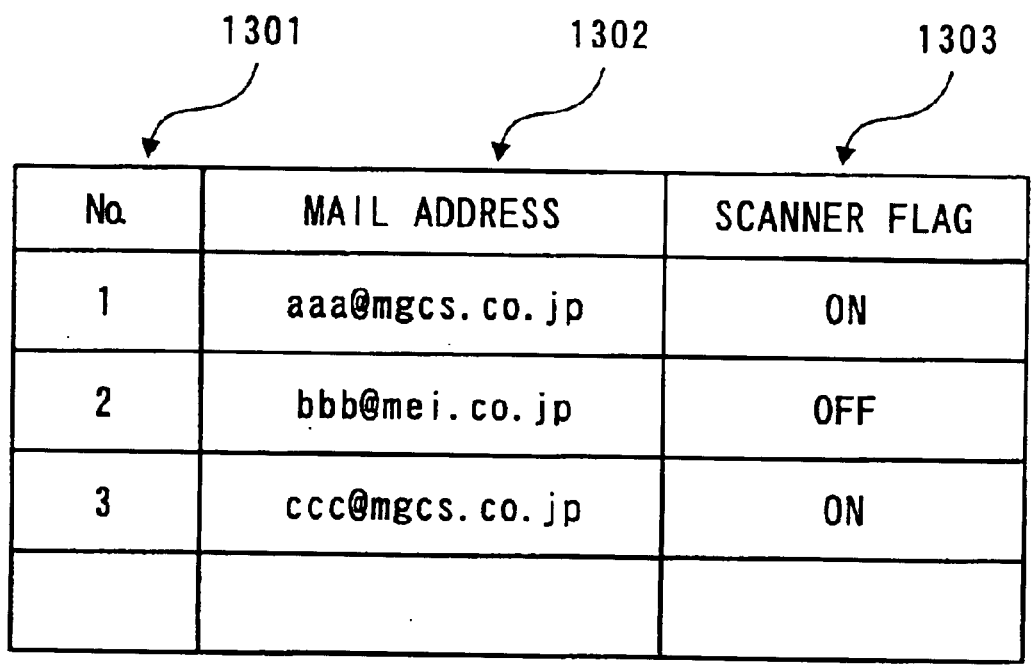
FIG. 13 is a one-touch button table according to the above-mentioned second embodiment.

A one-touch button number 1301, a destination mail address 1302, and a scanner flag 1303 are registered in the one-touch button table to be associated with one another as shown in FIG. 13. If the scanner flag 1303 is on, this indicates that this destination mail address 1302 is used in network scanner processing, and if it is off, this indicates that this destination mail address is used in IFAX transmission processing.

A display controlling section 1203 displays a message for registering the destination mail address 1302 on a display 1206 by control of the one-touch registering section 1201.

When any one of one-touch buttons is depressed, a one-touch processing section 1204 sends the destination mail address 1302, which corresponds to the depressed one-touch button, to the e-mail generating section 506 with reference to the one-touch button table.

A determining section 1205 identifies the depressed one-touch button number 1301, and determines whether IFAX transmission processing or network scanner processing is performed with reference to the one-touch button table.

Figure 14:
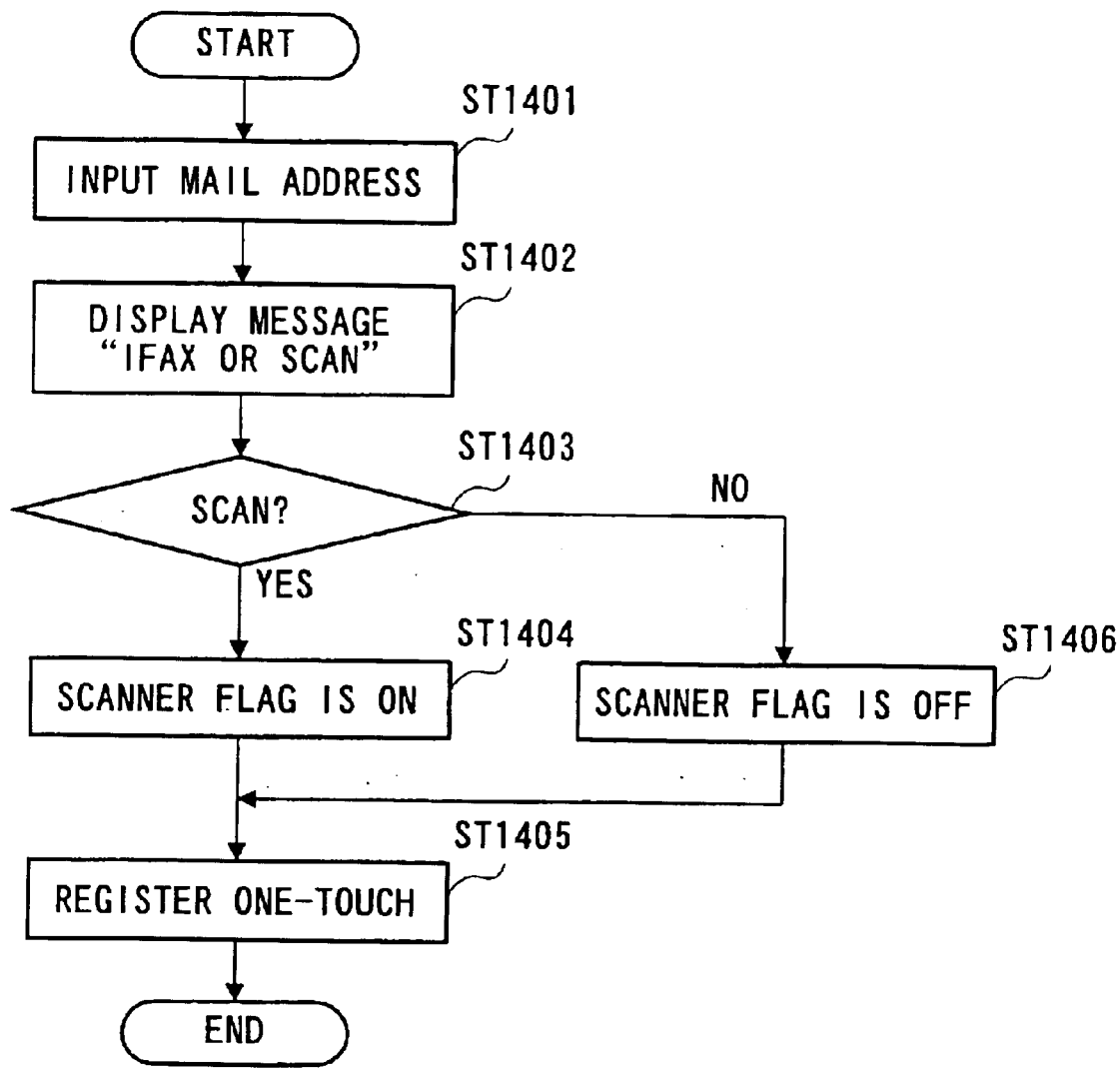
FIG. 14 is a flowchart showing a one-touch button entering operation of the Internet facsimile apparatus according to the above-mentioned second embodiment.

FIG. 14 is a flowchart showing the registering operation of the one-touch button of the IFAX according to the second embodiment.

The destination mail address 103 is input in ST1401, thereafter the one-touch registering section 1201 causes the display controlling section 1203 to display the message, "IFAX or SCAN", on the display 1206 at step ST1406. The operator selects either one of IFAX and network scanner (SCAN).

In ST1403, the one-touch registering section 1201 determines whether or not the operator selects the network scanner. If the operator selects the network scanner, the one-touch registering section 1201 sets the scanner flag 1303 in ST1404 to indicate that the destination mail address is used in network scanner processing. Thereafter, the one-touch registering section 1201 registers the destination mail address 1302 in the one-touch button table in ST1405.

While, if the operator does not select the network scanner ST1403, the one-touch registering section 1201 doesn't set the scanner flag 1303 to indicate that the destination mail address is used in IFAX transmission processing in ST1406. Thereafter, the one-touch registering section 1201 registers the destination mail address 1302 in the one-touch button table in ST1405.

Figure 15:
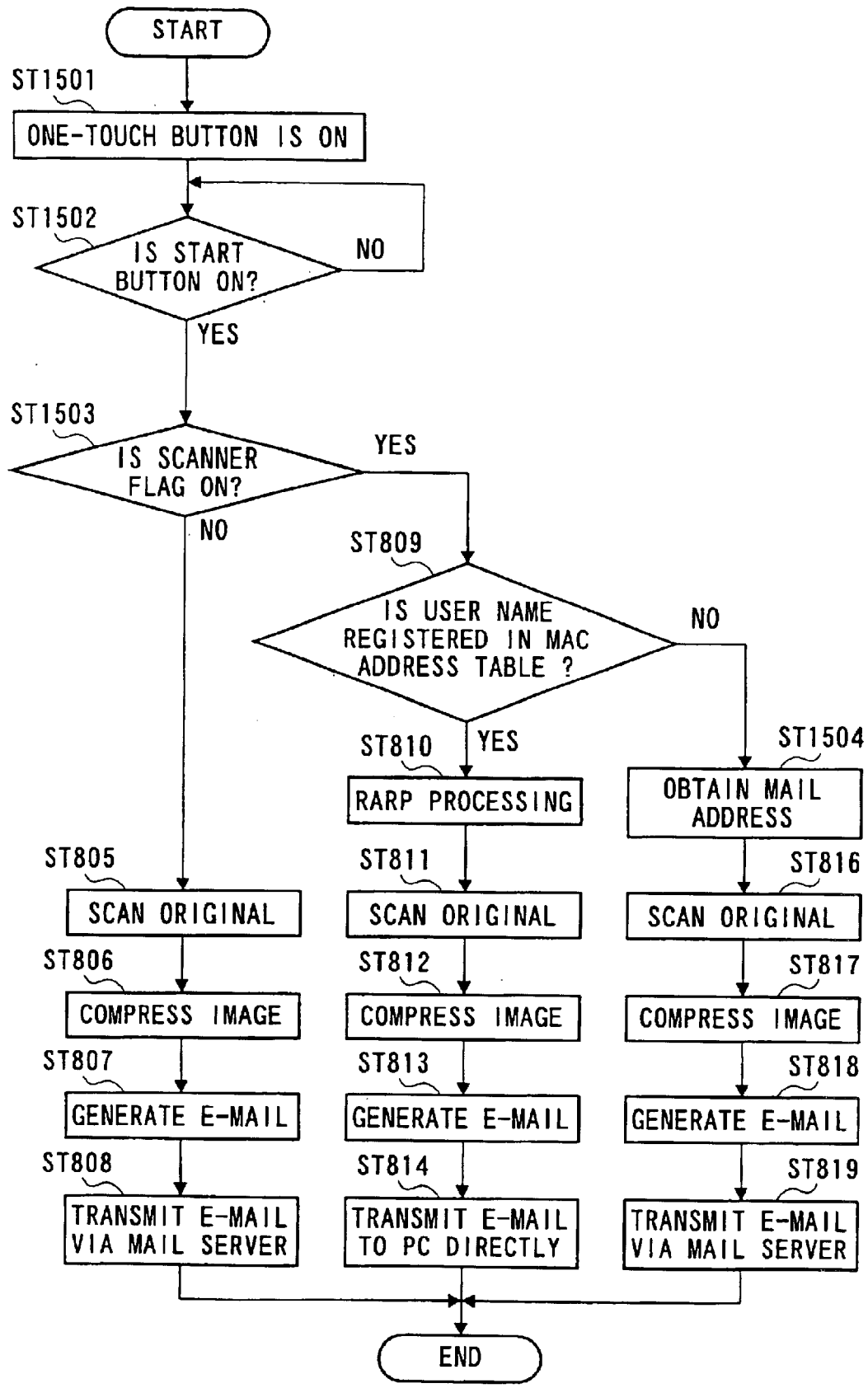
FIG. 15 is a flowchart showing image transmission processing of the Internet facsimile apparatus according to the above-mentioned first embodiment.

Next, an explanation will be given of image transmission processing of the IFAX according to the second embodiment. FIG. 15 is a flowchart showing image transmission processing of the IFAX according to the second embodiment. Regarding the same steps as those of the first embodiment shown in FIG. 8, the same reference numerals as those of the first embodiment are added thereto, and the explanation is omitted.

In ST1501, the determining section 1205 detects the depression of the one-touch button of the panel control section 18, and recognizes this number 1301. The determining section 1205 detects the depression of the start button in ST1502, and determines whether or not the scanner flag 1303, which corresponds to the depressed one-touch button number 1301, is on with reference to the one-touch button table in ST1503. If the scanner flag 1303 is off, the determining section 1205 instructs each section to execute IFAX transmission processing in ST805 to ST808. While, if the scanner flag 1303 is on, the determining section 1205 instructs each section to execute network scanner processing in ST809 to ST819 and ST1504. Here, in ST1504, the destination mail address 1302, which corresponds to the one-touch button number 1301, is scanned with reference to the one-touch button table, and sent to the e-mail generating section 506.

As mentioned above, the IFAX of the second embodiment is different from that of the first embodiment in that IFAX transmission processing and network scanner processing are differentiated by use of the one-touch button function. According to the second embodiment, the scanner flag 1303 is added to the one-touch button table 1302, and if this scanner flag 1303 is off, it is determined that this is IFAX transmission processing, and if this scanner flag 1303 is on, it is determined that this is network scanner processing. As a result, since the operator has only to depress the one-touch button and the start button sequentially similar to the general facsimile transmission, there is no need to consider the processing content. Also, in the second embodiment, since it is not always necessary to provide a button specifically designed to instruct network scanner processing, neither an increase in the number of components nor a change in the mould is generated, allowing a reduction in the cost of IFAX development and manufacture.

The second embodiment has explained the case in which the scanner flag is added to the registration table of the one-touch button, but the same processing as that of the second processing may be performed by adding the scanner flag to the registration table of abbreviated dialing in place of the one-touch button.

Also, the second embodiment has explained the case in which the scanner flag is added to the registration table of one-touch button, but a ifax flag may be added to the registration table. If the ifax flag is on, this indicates that this destination mail address is used in IFAX transmission processing, and if it is off, this indicates that this destination mail address is used in network scanner processing.

The present invention is not limited to the aforementioned first and second embodiments. For example, the first and second embodiments use SMTP in order to directly transfer image data to the PC in network scanner processing. However, the present invention can be applied to one, which requires the IP address using the communication protocol other than SMTP, for example, a case in which the Jet-Send™ system proposed by HP Company is used in transferring image data to the PC.

Also, the first and second embodiments store the MAC address of PC 4 to the MAX address table area 510 of RAM 13. However, the MAC address of PC 4 is registered in the server, and the plurality of IFAXs may inquire the MAC address of PC 4 of this server.

Moreover, in the first and second embodiments, the PC 4 itself responds to the RARP request, which is sent to the self-apparatus from the IFAX 4, however, the RARP server for performing the RARP response may be provided aside from the IFAX 1.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software are. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

As mentioned above, according to the present invention, the physical address of the image receiving apparatus is stored, the IP address of the image receiving apparatus is obtained by use of this physical address, and image data is directly transmitted to the image receiving apparatus by use of this obtained IP address. This makes it possible to directly transmit image data to the image receiving apparatus in the network to which the IP address is automatically assigned from the outer section.

Also, as mentioned above, according to the present invention, the notification of the self-physical address is sent to the image receiving apparatus, the notification of the IP address assigned to the self apparatus is sent in accordance with the request from the image transmitting apparatus by use of this physical address, and image data is directly received from the image receiving apparatus by use of this IP address. This makes it possible to directly receive image data from the image transmitting apparatus in the network to which the IP address is automatically assigned from the outer section.

The present invention is not limited to the above described embodiments, and various variations and modifications may be possible without departing from the scope of the present invention.

This application is based on the Japanese Patent Application No. HEI11-288174 filed on Oct. 8, 1999, entire content of which is expressly incorporated by reference herein.

What is claimed is:

1. An image transmitting apparatus for transmitting image data to an image receiving apparatus to which a changeable IP address is assigned by an external apparatus according to first and second modes, the image transmitting apparatus comprising:

a memory that stores a table including a fixed address of the image receiving apparatus, the fixed address comprising a MAC (Media Access Control) address, and being stored in association with a destination mail address;

a processor configured to obtain the current IP address of the image receiving apparatus by use of the fixed address stored in the memory;

an inputter for inputting the destination mail address;

a transmitter for directly transmitting image data to the image receiving apparatus by use of the IP address, the transmitter including a detector that detects whether or not a specific mark is added to the input destination data; and a searcher for searching the fixed address corresponding to the destination mail address input by the inputter, wherein the processor obtains the IP address of the image receiving apparatus by use of the fixed address searched by the searcher, wherein the transmitter, in the first mode, directly transmits image data to the image receiving apparatus by use of the IP address in response to the IP address being obtained by the processor, and, in the second mode, indirectly transmits image data to the image receiving apparatus via a mail server in response to the IP address not being obtained by the processor, wherein said transmitter directly transmits image data to the image receiving apparatus by use of the IP address when the specific mark is not added to the destination data, and indirectly transmits image data to the image receiving apparatus by use of the mail server when the specific mark is added to the destination data.

2. An image transmitting apparatus for transmitting image data to an image receiving apparatus to which a changeable IP address is assigned by an external apparatus, the image transmitting apparatus transmitting the image data to an image receiving apparatus indirectly via a mail server, the image transmitting apparatus comprising:

a memory that stores a table including a plurality of fixed addresses each corresponding to one of a plurality of image receiving apparatuses, each fixed address being associated with destination data and comprising a MAC (Media Address Control) address;

an inputter that inputs destination data;

a searcher that searches the fixed addresses stored in said memory, and that obtains a fixed address corresponding to the destination data input by said inputter;

a processor configured to obtain a current IP address of an image receiving apparatus to which the image data is transmitted, by use of the fixed address obtained by said searcher; and a transmitter configured to one of directly transmitting the image data to the image receiving apparatus by use of the IP address in response to the IP address being obtained by said processor and indirectly transmitting the image data to the image receiving apparatus via the mail server in response to the IP address not being obtained by the processor, the transmitter including a detector that detects whether or not a specific mark is added to the input destination data;

wherein said transmitter directly transmits image data to the image receiving apparatus by use of the IP address when the specific mark is not added to the destination data, and indirectly transmits image data to the image receiving apparatus by use of the mail server when the specific mark is added to the destination data.

3. The image transmitting apparatus according to claim 2, wherein the transmitter directly transmits the image data to the image receiving apparatus when the image transmitting apparatus and the image receiving apparatus are connected without requiring access to the Internet.

4. The image transmitting apparatus according to claim 2, wherein the image receiving apparatus comprises a personal computer connected to a network to which the image transmitting apparatus is connected.

5. The image transmitting apparatus according to claim 2, wherein the changeable IP address is assigned by a DHCP server.

6. The image transmitting apparatus according to claim 2, wherein said processor performs an RARP processing sequence to obtain the current IP address of an image receiving apparatus to which the image data is transmitted.

7. The image transmitting apparatus according to claim 2, wherein the specific mark comprises a @ mark.

8. An image transmitting apparatus for transmitting image data to an image receiving apparatus to which a changeable IP address is assigned by an external apparatus, the image transmitting apparatus transmitting the image data to an image receiving apparatus indirectly via a mail server, the image transmitting apparatus comprising:

a memory that stores a table including a plurality of fixed addresses each corresponding to one of a plurality of image receiving apparatuses, the fixed addresses comprising MAC (Media Access Control) addresses;

a processor configured to obtain a current IP address of an image receiving apparatus to which the image data is transmitted, by use of the fixed addresses stored in said memory; and a transmitter that directly transmits the image data to the image receiving apparatus by use of the IP address obtained by said processor in response to the processor obtaining the IP address, the transmitter including a detector that detects whether or not a specific mark is added to the input destination data;

wherein said transmitter directly transmits image data to the image receiving apparatus by use of the IP address when the specific mark is not added to the destination data, and indirectly transmits image data to the image receiving apparatus by use of the mail server when the specific mark is added to the destination data.

9. The image transmitting apparatus according to claim 8, wherein said processor performs an RARP processing sequence to obtain the current IP address of an image receiving apparatus to which the image data is transmitted.

10. A method for transmitting image data to an image receiving apparatus to which a changeable IP address is assigned by an external apparatus, utilizing an image transmitting apparatus which indirectly transmits the image data to an image receiving apparatus via a mail server, the method comprising:

storing a plurality of fixed addresses each corresponding to one of a plurality of image receiving apparatuses into a memory, the fixed addresses being associated with a destination data and comprising MAC (Media Access Control) addresses;

inputting a destination address to which the image data is transmitted;

searching the fixed addresses stored in the memory, corresponding to the input destination address;

obtaining a current IP address of an image receiving apparatus to which the image data is transmitted, by use of the fixed address; and directly transmitting the image data to the image receiving apparatus by use of the obtained IP address in response to an IP address being obtained, wherein the direct transmitting includes detecting whether or not a specific mark is added to the input destination address; and wherein the direct transmitting of image data to the image receiving apparatus by use of the IP address is performed when the specific mark is not added to the destination address; and indirectly transmitting image data to the image receiving apparatus by use of the mail server is performed when the specific mark is added to the destination address.

11. The method according to claim 10, wherein an RARP processing sequence is performed to obtain the current IP address of an image receiving apparatus to which the image data is transmitted.

12. A method for transmitting image data to an image receiving apparatus to which a changeable IP address is assigned by an external apparatus, utilizing an image transmitting apparatus which indirectly transmits the image data to an image receiving apparatus via a mail server, the method comprising:

storing a plurality of fixed addresses each corresponding to one of a plurality of receiving apparatuses into a memory, each fixed address comprising a MAC (Media Access Control) address;

obtaining a current IP address of an image receiving apparatus to which the image data is transmitted, by use of the fixed addresses stored in the memory; and directly transmitting the image data to the image receiving apparatus by use of the obtained IP address in response to obtaining of an IP address, wherein the direct transmitting includes detecting whether or not a specific mark is added to the input destination address;

wherein the directly transmitting of image data to the image receiving apparatus by use of the IP address is performed when the specific mark is not added to the destination address; and indirectly transmitting of image data to the image receiving apparatus by use of the mail server is performed when the specific mark is added to the destination address.

13. The method according to claim 12, wherein an RARP processing sequence is performed to obtain the current IP address of an image receiving apparatus to which the image data is transmitted.

* * * * *